United States Patent [19]
Cartier

[11] Patent Number: 4,781,429
[45] Date of Patent: Nov. 1, 1988

[54] OPTICAL FIBER CONNECTION BASE FOR CONNECTING OPTICAL FIBERS OR AN OPTICAL FIBER AND AN OPTOELECTRONIC COMPONENT

[75] Inventor: Jacques Cartier, Fontenay Sous Bois, France

[73] Assignee: Radiall Industrie, Rosny Sous/Bois, France

[21] Appl. No.: 887,952

[22] Filed: Jul. 22, 1986

[30] Foreign Application Priority Data

Jul. 22, 1985 [FR] France .................. 85 11170

[51] Int. Cl.$^4$ ................................ G02B 6/36
[52] U.S. Cl. ........................ 350/96.20; 350/96.21
[58] Field of Search .................. 350/96.20, 96.21

[56] References Cited

FOREIGN PATENT DOCUMENTS

| | | |
|---|---|---|
| 0063085 | 10/1982 | European Pat. Off. . |
| 0001647 | 8/1979 | Japan . |
| 0065915 | 5/1980 | Japan . |
| 0113111 | 9/1981 | Japan .................. 350/96.20 |
| 0040984 | 3/1982 | Japan .................. 350/96.17 |
| 0161819 | 10/1982 | Japan . |
| 0143309 | 8/1983 | Japan . |

OTHER PUBLICATIONS

"Optical Connector" by Research Disclosure, (Jun. 1982), 350, #96.20.

Primary Examiner—William L. Sikes
Assistant Examiner—Akm E. Ullah
Attorney, Agent, or Firm—Arnold, White & Durkee

[57] ABSTRACT

An optical fiber connection base for receiving an optical fiber positioned and centered in a ferrule having a tubular axial extension with a passage into which the fiber is introduced and immobilized with its front end coplaner with the front end of the tubular extension. The base has a unitary tubular body with a front support. An interior projection having a convex bearing surface extends rearwardly into the bore of the body from the rear face of the front support. The front support and projection have an axial opening to receive the tubular extension of a ferrule inserted into the body from the rear of the bore. An annular conical wall of the ferrule seats on the covex bearing surface of the body along a circular line of contact at a predetermined distance from the front face of the front support, so that the front end of the ferrule is centered and coplaner with the front face of the support.

9 Claims, 3 Drawing Sheets

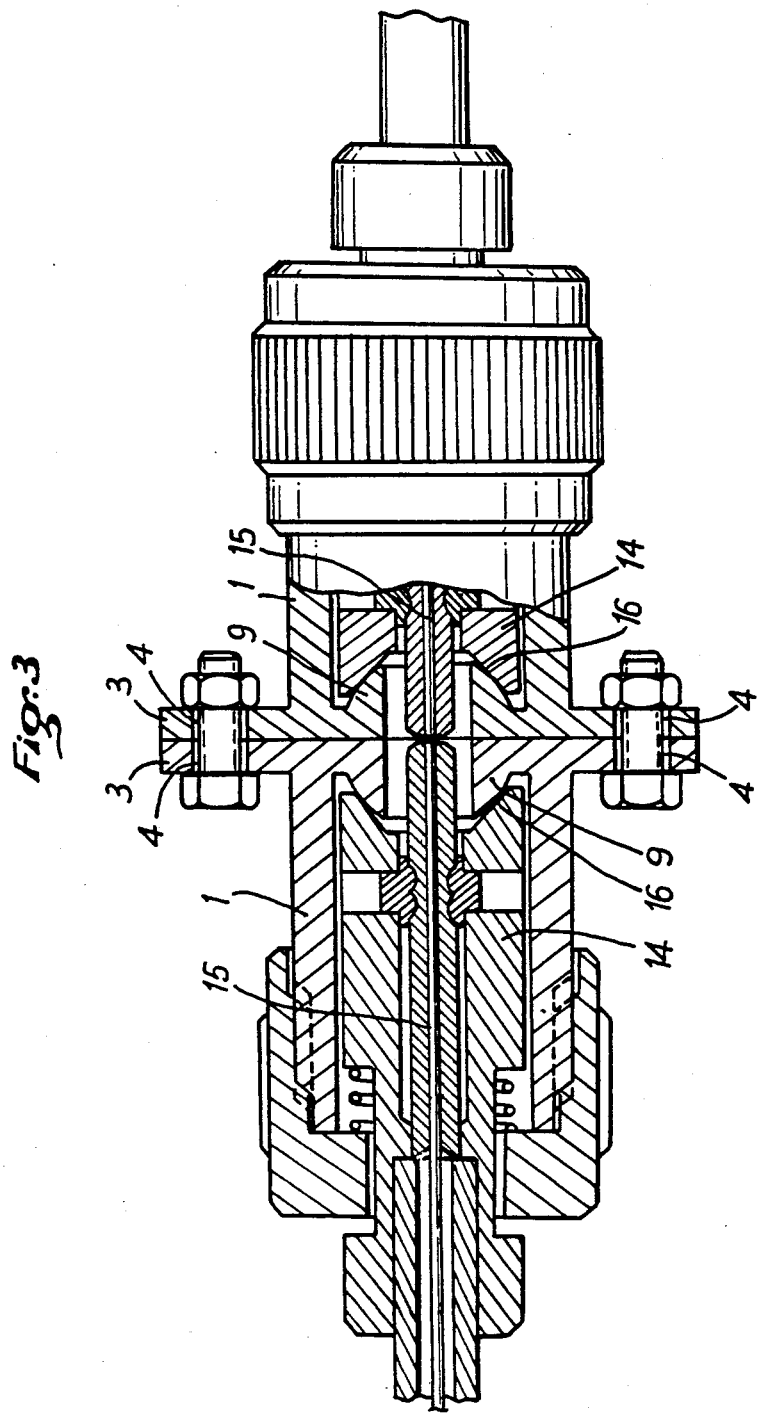

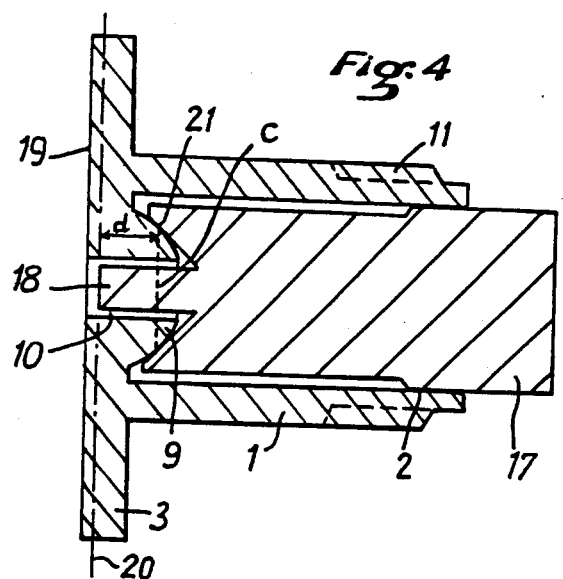
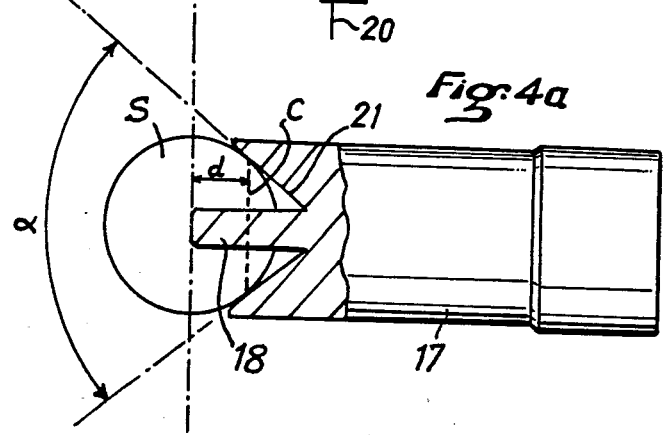
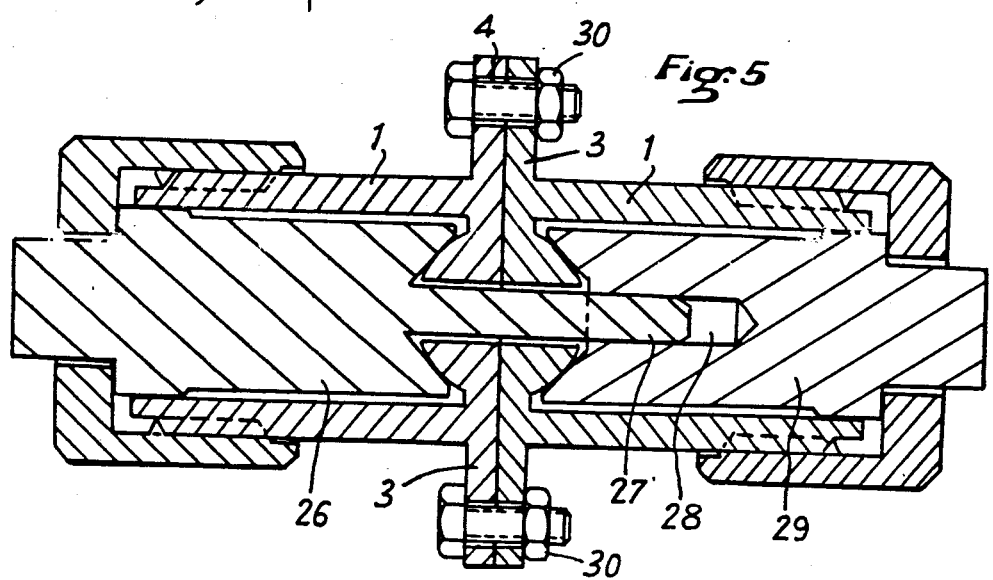

OPTICAL FIBER CONNECTION BASE FOR CONNECTING OPTICAL FIBERS OR AN OPTICAL FIBER AND AN OPTOELECTRONIC COMPONENT

The present invention relates to a connection base for an optical fiber and to its use for making a connection between an optical fiber and an optoelectronic component or a connection between two optical fibers.

More specifically, the present invention relates to a base arranged to receive an optical fiber positioned and centered in a ferrule having an axial tubular extension provided with a conduit into which the optical fiber can be introduced with clearance or play, and immobilized so that its end coincides with the end of the projection, and surrounding the rear portion of the projection is a conical annular side wall.

BACKGROUND OF THE INVENTION

Applicant's assignee has already described in its French patent applications Nos. 81-07144 and 83-05422, the use of such ferrules for making optical connections and the different steps for their preparation for positioning and centering the fiber in the ferrule, especially with respect to the conical wall which is set back with respect to the end of the fiber.

To make the optical connections provision was made in the earlier documents to use an abutment body, especially spherical, with axial opening to receive the axial projection of the ferrule, the abutment body defining a bearing contact surface with the conical annular wall of the ferrule, so that during any relative movement of the bearing surfaces in contact, the end of the fiber at the level of the end surface of the projection of the ferrule is held at a constant predetermined distance from the center of the abutment body.

The abutment body, in the shape of a sphere for the connection of two optical fibers or a semi-sphere for the connection of an optical fiber to an electroluminescent diode, must have great dimensional precision, generally on the order of + or −3 um.

It is expensive to make spheres or semi-spheres of such precision.

SUMMARY OF THE INVENTION

Applicant has now discovered that surprisingly, it is possible to make optical connections using a principle similar to that mentioned in the above prior documents, without the need for machining a precision spherical body, thus significantly reducing the cost of manufacture.

For this purpose, according to the invention, there is used to receive the ferrule described above, and having an optical fiber, a unitary base comprised of a tubular body having a front support or flange having on its rear face, inside the bore of the body, a projection having at least one convex bearing surface. The support or flange has an axial opening for receiving the axial projection of the ferrule inserted from the rear of the bore in the base so that its conical bearing surface seats on the convex bearing surface of the head along a circular line of contact in a predetermined position with respect to the front face of the support.

It is to be understood that, according to the invention, the conditions of operation anticipated in Applicants earlier connectors, especially the one described in French application No. 81-07144, are reconstructed, the contact between the bearing surfaces facing the ferrule and the projecting head of the base occuring along a circular line whose position is perfectly defined with respect to the end of the fiber.

Contrary to the earlier technique very precise tolerances are not required.

Thus, the base can be machined using a forming tool, its inner projection or head being formed with tolerances on the order of + or −0.1 mm.

As a variation, the base according to the invention can be made by molding or casting with tolerances of the same order.

The base according to the invention can be made of any appropriate material, particularly metal, such as for example, a zinc-aluminum alloy known as ZAMAC.

The inner projecting head of the base can be in the form of a spherical projection.

As a variation, the projecting head can include, originating at the rear surface of the front support, a cylindrical bearing surface joined to a small radius toric bearing surface joined to a flat transverse surface.

In practice, and to obtain a perfectly precise position of the end of the fiber with respect to the front surface or plane of the front support or flange of the base, a base blank is made with a front support of excess thickness, a precision gage which duplicates the form of the ferrule is positioned in the base, the position of the axial projection of the gage in the axial opening of the support of the base is detected, particularly by palpation, and the front face or flange of the base is machined to coincide with the plane of the front face of the gage.

The gage is then removed and the ferrule containing the optical fiber is inserted in the base and immobilized in the base by a sleeve threaded on the rear of the base and which exerts an axial force on the ferrule, advantageously via a spring.

When it is desired to form a connection of an optical fiber to a casing of an optoelectronic component such as a diode, the assembly thus formed is fastened on the front face of the casing containing the component.

When it is desired to connect two optical fibers, two bases are made in the manner described above, the bases are aligned axially using two gages, one having an elongated axial extension and the other gage having an axial bore to receive the extension of the first gage. The two bases are then immobilized and fixed in the aligned positions achieved by the mutual engagement of the gages, by tightening fasteners passing through the respective front supports or flanges.

The two gages are then removed and two ferrules each containing an optical fiber are inserted in the respective bases and immobilized with threaded sleeves, as explained above.

In order to make the invention better understood, non-limiting examples of embodiments will now be described with reference to the accompanying drawings.

BRIEF DESCRIPTION OF DRAWINGS

FIG. 3 shows an axial section of the connection of two optical fibers using two bases or mountings according to the first embodiment of the invention;

FIG. 4 shows a preparation step using a gage in the base or mounting of the first embodiment of the invention;

FIG. 4a shows the gage of FIG. 4, positioned relative to a reference sphere; and FIG. 5 shows the step of aligning two bases according to the invention to make the connection according to FIG. 3.

DETAILED DESCRIPTION

Figure 1:
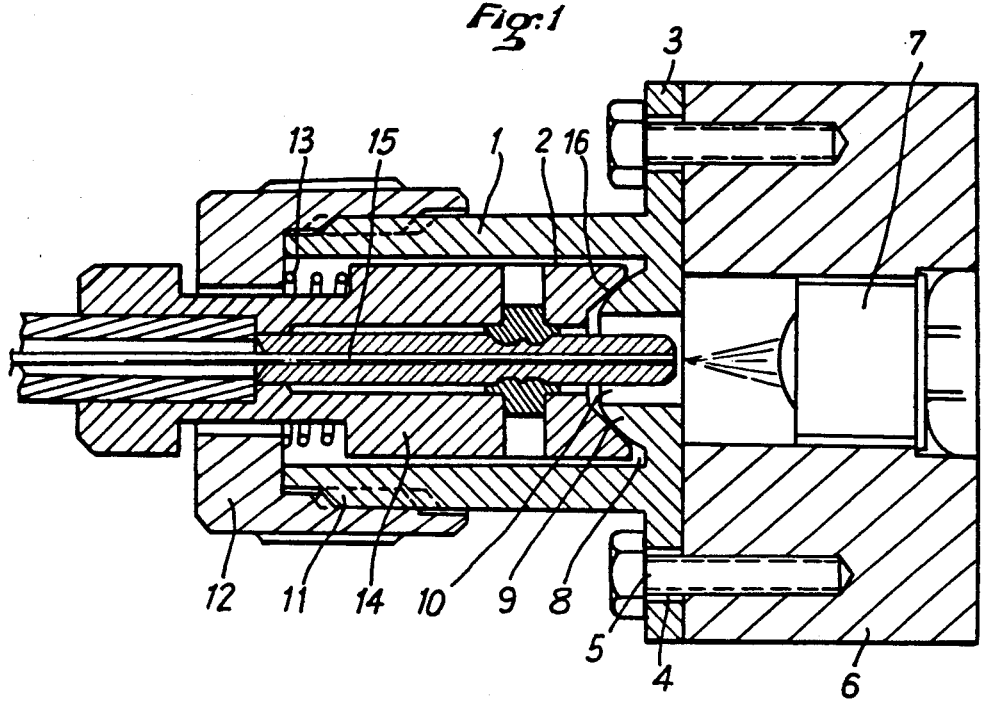
FIG. 1 shows an axial section of the connection of an optical fiber and an electroluminescent diode using a base or mounting according to a first embodiment of the invention.

The base or mounting shown at FIG. 1 includes a tubular body 1 having a bore 2 and ending in a front support flange 3 having opening 4 for receiving fastening screws 5 to secure the base on the front face of a casing 6 containing an electronic component such as an electroluminescent diode 7.

The inner or rear face 8 of the support flange has, inside bore 2, a projection in the shape of a spherical head 9, and an opening 10 extends through the head and flange.

The rear portion of the tubular body 1 of the base has an exterior thread 11 for receiving an internally threaded screw ring or sleeve 12 which applies pressure by means of a spring 13, to a ferrule 14 containing an optical fiber 15 and having a conical bearing surface 16 which is pressed against the spherical bearing surface of projecting head 9 within the base. The structure of such a ferrule 14 as well as the different mounting steps of positioning and aligning of the optical fiber in the ferrule have already been described in U.S. application Ser. No. 595,443, to which reference can be made for more details of this construction.

The base is made as follows.

First, a blank like that shown at FIG. 4 is made by machining or by molding, this blank having a front support in the form of a flange 3 of excess thickness. Projecting head 9, in the shape of a spherical head in the example shown, is not made with great precision. A tolerence of + or −0.05 mm on the radius is sufficient in practice.

A high precision gage 17 is inserted in bore 2 of the blank or rough base. The gage has an axial extension 18 engaging in the axial opening through support flange 3, and the projecting head 9 of the base.

There was previously determined on gage 17, as shown at FIG. 4a, a mechanical reference in the form of a circular line C constituting the line of contact between the conical bearing surface of the bore and a reference sphere S. This line of contact C is located at a predetermined distance d from the end of extension 18 located in the axial plane of the sphere, the position of the line of contact C being determined by the diameter of the sphere and the angle of the cone which in practice is advantageously 90° + or − 0.5°.

After gage 17 is seated in the blank or rough base, a palpation or feeler device (not shown), is used to determine the position of the end face of extension 18, with respect to the plane of the front face 19 of the blank base, and the excess thickness of the front face of the flange is machined away to make the plane of the front face of the flange coincide with the end face of the projection 18, as shown by the phantom line on FIG. 4. This machining can easily be performed with a precision of 10 um.

Due to the precision of positioning of the gage of the conical surface 21 with respect to the extension 18, accurate positioning is thus assured for the circular line of contact C of the conical bearing surface against the spherical projection 9, with respect to the center of the opening 10 of the support at its outer end face, as indicated by the phantom line 20. The distance d between the line C and the outer face of the support flange is the same as that shown at FIG. 4a.

Then, when the gage 17 is withdrawn and a ferrule 14 is placed as shown at FIG. 1, the ferrule is perfectly positioned by its conical bearing surface 16 against the projecting head 9 of the base, thus providing the desired positioning and centering of the end of optical fiber 15.

Figure 2:
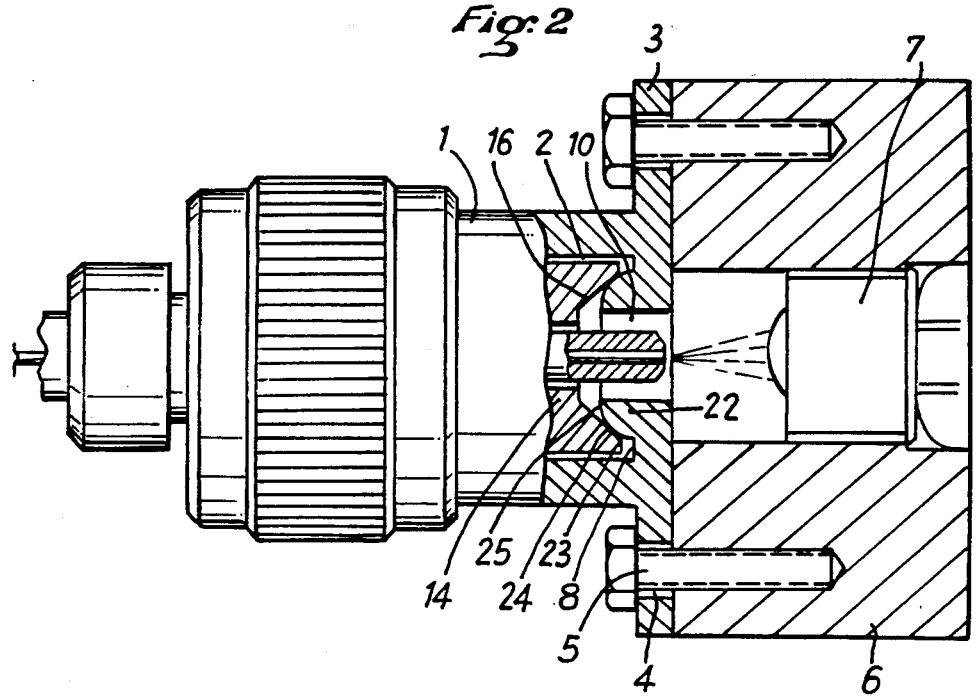
FIG. 2 is a view similar to FIG. 1, and showing a base or mounting according to a second embodiment of the invention.

The embodiment of FIG. 2 differs from that of FIG. 1 in the shape of the the projecting head 22, which starting from the rear face 8 of support flange 3, has in bore 2, in succession, a cylindrical bearing surface 23, a toric bearing surface 24, and a flat transverse bearing surface 25.

Bearing surfaces 23, 24, 25 can be formed without great precision. For example, tolerences of + or −0.05 to 0.1 um are sufficient in practice.

Toric bearing surface 24 has a reduced radius with respect to that of the projecting head 9 of FIG. 1, and it is on this sperical bearing surface that the contact along a circular line is made with the conical bearing surface 16 of ferrule 14.

The manufacture of the base of the embodiment of FIG. 2 is of course performed in the same way as is described with reference to FIG. 4, for the base of the embodiment of FIG. 1.

FIG. 3 shows the connection of two optical fibers using two bases 1 identical to those of FIG. 1, with their front faces engaging, each of the bases having received therein a ferrule 14 as shown in the embodiment of FIG. 1.

The two bases are connected by fastening means of the screw and nut type, traversing openings 4 in the respective support flanges 3 of the bases.

To attain alignment of the two bases, the procedure of FIG. 5 is used.

A gage 26 is used which is identical to the gage 17 but has a longer extension 27. A gage 29 is also used which has a bore 28 to receive the extension 27. The bases 1 of FIG. 5 have previously been prepared by machining their front flange faces, as described above. The nuts 30 are loose when the gages are inserted and seated on the spherical projecting heads. The respective bases are precisely aligned axially by the gages 26 and 29 in the bores of the opposed bases. The bases are then secured together in this aligned position by tightening the nuts 30.

Then, the gages 26 and 29 are removed and the two ferrules 14 each containing an optical fiber are positioned in the respective bases, and the springs and threaded sleeves are installed to provide the assembly show at FIG. 3.

Although the invention has been described in connection with particular embodiments, it is of course in no way thereby limited and can undergo numerous variations and modifications without exceeding either its scope or its spirit.

I claim:

1. An optical fiber connection base for receiving an optical fiber positioned and centered in a ferrule having a tubular axial extension with a passage into which the fiber can be introduced with clearance and immobilized so that its end coincides with a front end of the tubular extension, said connection base comprising, a unitary tubular body having a front support at one end, and a bore extending from the other end of the body toward said front support, said front support having a substantially planner front face and a rear face, an interior projection having at least one convex bearing surface and extending rearwardly into the bore from the rear face of the front support, said front support and projection having an axial opening therethrough adapted to receive the tubular extension of the ferrule inserted into the body from the rear of the bore, so that an annular conical wall of the ferrule seats on the convex bearing surface of the body along a circular line of contact at a predetermined position relative to the front face of the front support.

2. An optical fiber connection base according to claim 1 wherein said unitary body comprises a machined body.

3. An optical fiber connection base according to claim 1 wherein said unitary body comprises a molded body.

4. An optical fiber connection base according to claim 1 wherein said interior projection comprises a spherical head.

5. An optical fiber connection base according to claim 1 wherein said interior projection comprises a shaped head composed of a cylindrical portion at the rear face of the front support, said cylindrical portion merging into a small radius toric surface which merges into a flat inner end face.

6. A method of making an optical fiber connection base comprising, providing a base blank having a unitary tubular body having a front support at one end, and a bore extending from the other end of the body toward said front support, said front support having a front face and a rear face and being of a thickness greater than that of the finished base, said base blank having an interior projection with at least one convex bearing surface extending rearwardly into the bore from the rear face of the front support and said front support and projection of said base blank having an axial opening therethrough, providing a precision gage duplicating the form of a ferrule and having a front extension and an annular conical wall around the front extension, positioning said gage in the bore of the blank to seat the conical surface of the gage on the interior projection of the blank base, detecting the axial position of the front end of the extension of the gage in the axial opening of the front support of the base blank, and machining the front face of the front support to coincide with the front end of the extension of the gage, to form the finished base.

7. A method of connecting an optical fiber and an optoelectronic component contained in a casing comprising; forming a base comprising a unitary tubular body having a front support at one end, and a bore extending from the other end of the body toward said front support, said front support having a substantially planar front face and a rear face, an interior projection having at least one convex bearing surface and extending rearwardly into the bore from the rear face of the front support, said front support and projection having an axial opening therethrough adapted to receive the tubular extension of the ferrule inserted into the body from the rear of the bore, so that an annular conical wall of the ferrule seats on the convex bearing surface of the body along a circular line of contact at a predetermined position relative to the front face of the front support; inserting into the body from the rear of the bore, a ferrule having a tubular extension and an annular conical wall; seating the conical wall on the convex bearing surface of the inner projection body by threading a ring into the body to cause a spring between the ring and the body to press the conical wall against the convex bearing surface; and securing the base containing the ferrule to a front face of the casing containing the optoelectronic component with fastening means in openings of the front support of the base.

8. A method of connecting optical fibers each contained in a ferrule comprising; providing two bases each comprising a unitary tubular body having a front support at one end, and a bore extending from the other end of the body toward said front support, said front support having a substantially planar front face and a rear face, an interior projection having at least one convex bearing surface and extending rearwardly into the bore from the rear face of the front support, said front support and projecting having an axial opening therethrough adapted to receive the tubular extension of the ferrule inserted into the body from the rear of the bore, so that an annular conical wall of the ferrule seats on the convex bearing surface of the body along a circular line of contact at a predetermined position relative to the front face of the front support; providing two ferrule gages, a first gage having a conical wall and an elongated axial extension, and a second gage having a conical wall and a bore for receiving the elongated axial extension of the first gage; inserting the first gage into one base so that the elongated axial extension projects through the opening of the front support of the base; inserting the second gage into the other base; aligning the bases in facing relation to each other by inserting the elongated axial extension of the first gage into the bore of the second gage; securing the bases together in aligned relation with fastening means traversing the front supports of the bases; removing the gages; inserting a ferrule containing an optical fiber into each base; and immobilizing each ferrule in its base.

9. The method of claim 8 wherein each ferrule is immobilized in its base by threading a ring onto the rear of the ferrule to exert an axial force on the ferrule with a spring between the ferrule and the ring.

* * * * *

UNITED STATES PATENT AND TRADEMARK OFFICE
CERTIFICATE OF CORRECTION

PATENT NO. : 4,781,429

DATED : November 1, 1988

INVENTOR(S) : Jacques Cartier

It is certified that error appears in the above-identified patent and that said Letters Patent are hereby corrected as shown below:

In Column 5, line 6, "planner" should read --planar--.

In Column 6, line 16, "into" should read --onto--.

Signed and Sealed this

Twenty-eighth Day of March, 1989

Attest:

DONALD J. QUIGG

Attesting Officer

Commissioner of Patents and Trademarks